United States Patent [19]
Parekh

[11] Patent Number: 5,928,736
[45] Date of Patent: Jul. 27, 1999

[54] COMPOSITE STRUCTURE HAVING INTEGRATED APERTURE AND METHOD FOR ITS PREPARATION

[75] Inventor: E. M. Parekh, Tucson, Ariz.

[73] Assignee: Raytheon Company, Lexington, Mass.

[21] Appl. No.: 08/707,892

[22] Filed: Sep. 9, 1996

[51] Int. Cl.[6] .................................................. B28B 21/00
[52] U.S. Cl. ...................... 428/34.5; 428/34.6; 428/34.7; 428/36.1; 428/36.4; 428/36.5; 428/36.91
[58] Field of Search .................................. 428/34.5, 34.6, 428/34.7, 36.1, 36.4, 36.5, 36.91

[56] References Cited

U.S. PATENT DOCUMENTS

| | | | |
|---|---|---|---|
| 4,185,472 | 1/1980 | Yates et al. | 64/1 S |
| 4,462,946 | 7/1984 | Goldsworthy | 264/23 |
| 4,603,071 | 7/1986 | Wehnert et al. | 428/112 |
| 4,867,822 | 9/1989 | Bannik et al. | 156/153 |
| 5,624,519 | 4/1997 | Nelson et al. | 156/245 |

*Primary Examiner*—Randy Gulakowski
*Attorney, Agent, or Firm*—David W. Collins; Leonard A. Alkov; Glenn H. Lenzen, Jr.

[57] ABSTRACT

A composite structure is fabricated by providing a mandrel having a winding surface and placing a shaped plug into the winding surface so that it extends from the winding surface. An uncured composite material is wound over the winding surface of the mandrel and laterally adjacent to the shaped plug. The composite material is cured, and the shaped plug and mandrel are removed. The shaped plug may be provided with an overlying bushing that is bonded to the composite material during curing and is not removed with the remainder of the shaped plug.

17 Claims, 4 Drawing Sheets

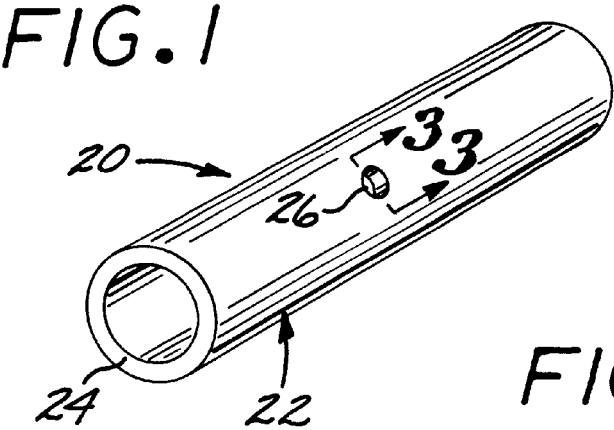
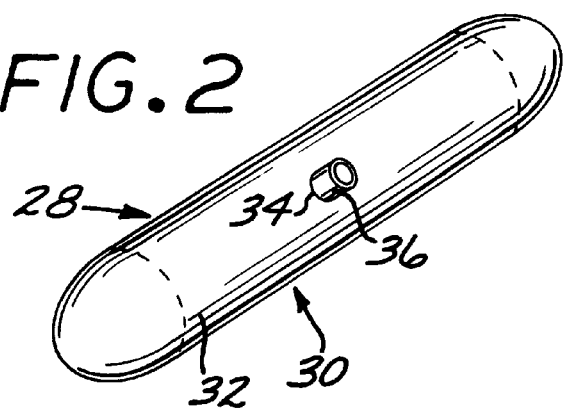
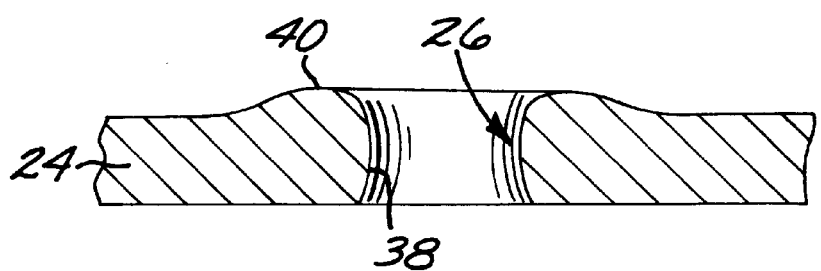
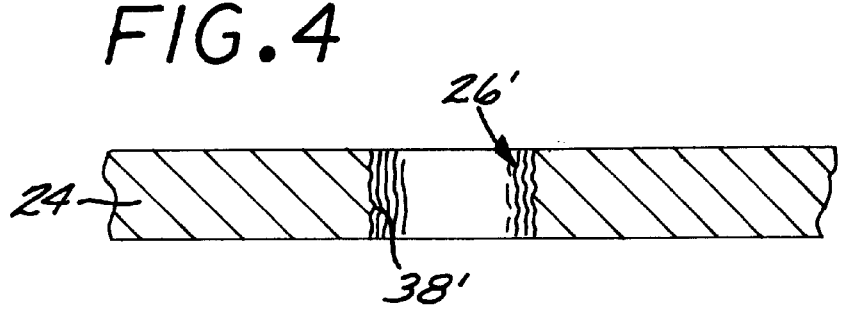

COMPOSITE STRUCTURE HAVING INTEGRATED APERTURE AND METHOD FOR ITS PREPARATION

BACKGROUND OF THE INVENTION

This invention relates to the fabrication of composite structures, and, more particularly, to the fabrication of composite structures having integrated apertures, by a winding method.

Composite materials are widely used in structural applications, including aerospace load-bearing structures. As used herein, a composite material is a material formed of fibers, preferably carbon or graphite fibers, embedded in a matrix, preferably a cured polymeric matrix. A convenient form for both the fabrication and use of the composite materials is a hollow form such as a tube, a hollow pressure vessel, or a hollow container, which may be cylindrical or non-cylindrical in cross-sectional shape. Such composite hollow structures have low weight, high axial strength and/or modulus, and high flexural strength and/or modulus.

The hollow structural form is readily fabricated by a winding operation. In a typical winding operation, a mandrel having the desired shape of the hollow form, but of smaller transverse dimensions, is provided. Bundles of the fiber material are wound over the mandrel in patterns dictated by the structural requirements of the completed hollow form. An uncured matrix polymeric precursor material, preferably in a viscous liquid form, is applied either simultaneously with the winding or after layers of the winding are completed. The mandrel with overwound composite material is placed into an oven or an autoclave to cure the matrix material. The mandrel is thereafter removed, and the cured composite structure is ready for use or, for some polymeric matrix materials, post curing followed by use.

In some instances, apertures through the wall of the hollow structure are required. Apertures in some cases are used for access to the interior of the structure. In other cases, they are used to bond or attach other structural members to the hollow structure.

The conventional practice for providing an aperture through the wall of the hollow composite structure is to fabricate the structure in the manner described above. The aperture is thereafter formed through the wall by cutting or machining techniques.

The present inventor has recognized that, while operable and acceptable for many applications, the existing technique for providing apertures through the wall of a composite structure has drawbacks in others. The cutting or machining operation leaves cut fibers at the edge of the aperture, which can adversely affect the structural performance adjacent to the aperture. There may be microcracks in the remaining fibers or in the matrix, which thereafter may lead to premature failure of the article and a poor surface quality. The cutting or machining operation is also time consuming and expensive, often requiring special tools and resulting in rapid wear of the tools.

Consequently, there is a need for an improved approach to the fabrication of composite structural shapes having apertures therein. The present invention fulfills this need, and further provides related advantages.

SUMMARY OF THE INVENTION

The present invention provides a fabrication approach for hollow composite structures with walls having apertures therethrough. No cutting or machining operation is required to form the aperture, thereby reducing fabrication costs and time. The edges of the apertures are structurally superior to those produced by conventional techniques, so that the mechanical properties of the structure produced by the present approach are superior to those of conventional apertured hollow composite structures. The approach of the invention may also be used to form apertures with permanent bushings bonded therein. The invention is widely applicable to a variety of hollow composite structures, such as hollow beams, tubes, capsules, and pressure vessels or containers with closed ends.

In accordance with the invention, a method for preparing a composite structure comprises the steps of providing a mandrel having a winding surface, and placing a shaped plug into the winding surface and extending therefrom. The method further includes applying an uncured composite material over the winding surface of the mandrel and laterally adjacent to the shaped plug, and curing the composite material. The shaped plug and mandrel are removed, and the free-standing composite structure may be post-cured. The shaped plug may optionally include an overlying bushing that is bonded to the sides of the aperture and left in place when the shaped plug and mandrel are removed.

The uncured composite material may be applied by any operable technique. A preferred approach is to wind the fiber material, preferably graphite or carbon fibers, over the mandrel and around the shaped plug, so that the fibers are locally clustered around the edges of the shaped plug. A good fill of fibers around the shaped plug is obtained by varying the fiber winding angles of the succeeding layers. The matrix material, preferably a viscous uncured polymer precursor material, is typically applied simultaneously with the fibers as they are wound or on top of a layer after it is wound.

The present approach produces an integrated aperture in the wall of the hollow composite structure, which aperture may be open or filled with a bushing. The present approach is distinct from the winding of a composite material over a non-removable branched core. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a perspective view of a wound composite tubular structure having an aperture in a sidewall;

FIG. 2 is a perspective view of a wound composite vessel structure having an aperture in a sidewall with a bushing extending therefrom;

FIG. 3 is a sectional view, taken along line 3—3 of FIG. 1, of the aperture region;

FIG. 4 is a sectional view, like that of FIG. 3, of an aperture formed by cutting or machining;

DETAILED DESCRIPTION OF THE INVENTION

Figure 5:
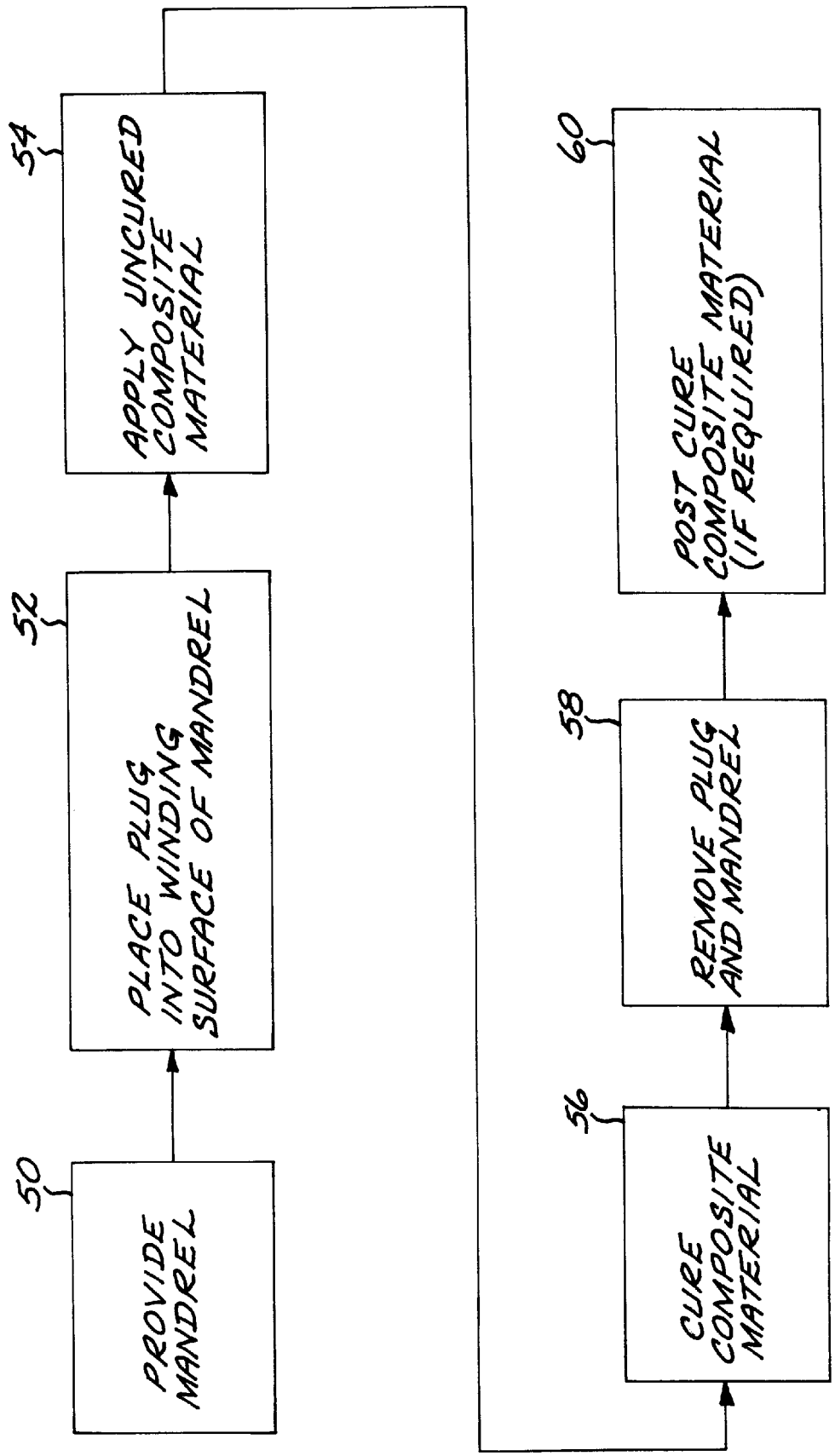
FIG. 5 is a block diagram of a preferred method for fabricating the apertured composite structure.

FIGS. 1 and 2 illustrate two composite structures made by the present approach. A composite tubular structure 20 of FIG. 1 includes a tubular shell 22 having a wall 24 formed of a cured composite material of fibers embedded in a cured polymeric matrix. In this case, the wall 24 includes only a sidewall of the tube. An aperture 26 opens through the wall 24. A composite vessel structure 28 of FIG. 2 includes a cylindrical tubular shell 30 having a wall 32 that in this case includes the cylindrical sidewall of the shell 30 and its ends as well. Am aperture 34 having a bushing 36 permanently bonded therein opens through the wall. The structures of FIGS. 1 and 2 are presented to illustrate various configurations possible with the present approach, and are not presented as limiting of the invention. For example, the aperture with bushing may be used with the tubular shell of FIG. 1.

In each case, the aperture includes an aperture edge 38 that defines the boundaries of the aperture, as seen in FIG. 3 for the case of the aperture 26. As will be discussed subsequently, the edge 38 is smooth and characterized by continuous, uncut fibers and cured polymeric matrix. The edge 38 is also locally thickened, numeral 40, due to the clustering of the wound fibers at the periphery of the aperture 26. The edge thickening 40 at the periphery of the aperture 26 provides added strength at the location where it is most needed, the aperture where there is a stress concentration. This type of edge 38 is contrasted with an edge 38', illustrated in FIG. 4, of an aperture 26' which is not in accordance with the invention. The edge 38' is formed by drilling or cutting an aperture into a completed, cured composite shell, and is characterized by cut fibers, microcracks in the remaining fibers, and microcracks in the cured polymeric matrix.

Although this difference between the smooth, integral aperture 26 and edge 38, on the one hand, and the rough-cut aperture 26' and edge 38', on the other, is seemingly small, it is highly significant to the mechanical properties of the composite structure. Failure initiation by either fatigue or monotonic loading occurs initiates more easily at the microcracks and other irregularities of the rough-cut edge 38', as seen in FIG. 4, than at a smooth, locally thickened, integrated edge 38 as seen in FIG. 3. This distinction is maintained regardless of the care taken to form the aperture 26', using small cuts and very sharp cutting tools, due to the characteristic nature of the composite material.

Figure 6:
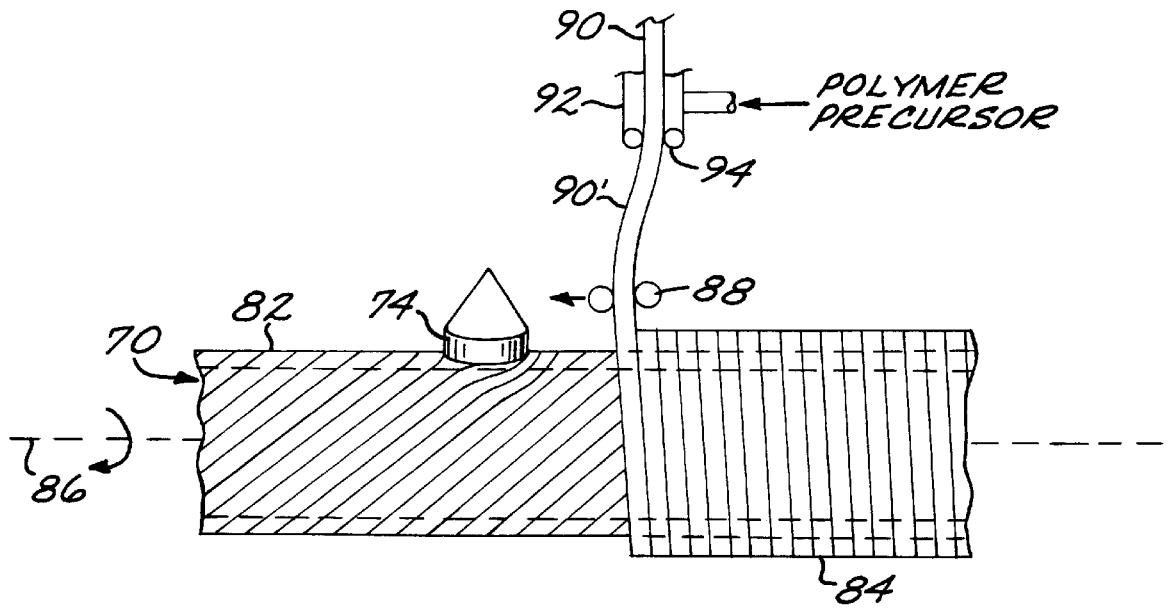
FIG. 6 is a schematic perspective view of a first winding apparatus and operation used to prepare the apertured composite structure.
Figure 7:
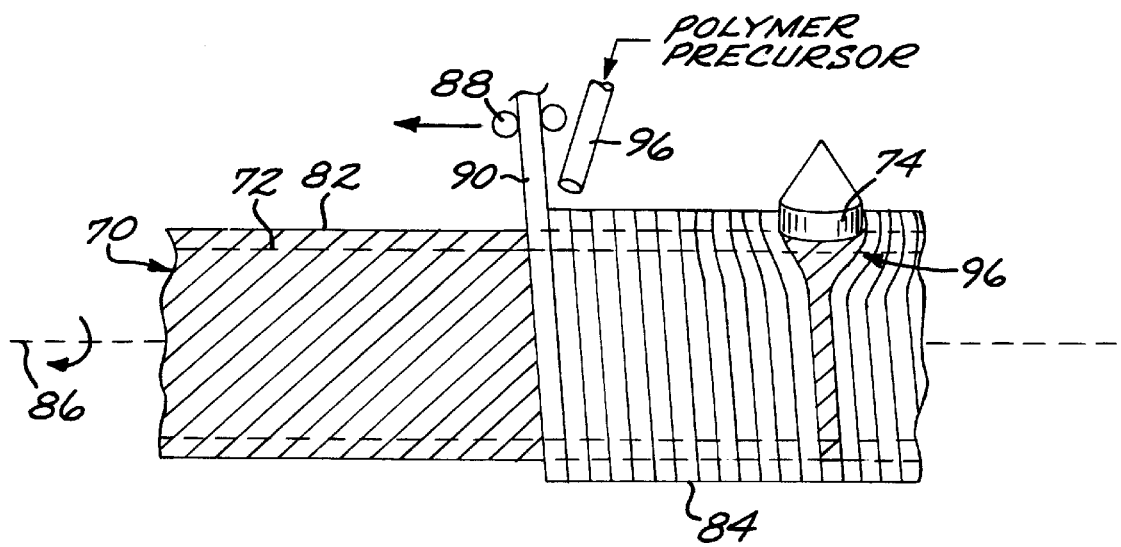
FIG. 7 is a schematic perspective view of a second winding apparatus and operation used to prepare the apertured composite structure.

FIG. 5 is a block diagram illustrating a preferred method according to the invention for preparing the composite structure with the integral aperture. As seen in the structures of FIGS. 6 and 7, a mandrel 70 having a winding surface 72 is provided, numeral 50. The winding surface 72 defines the shape of the wall of the finished structure, and may be of any operable shape. In many applications, the winding surface 72 is cylindrical, although it need not be so.

Figure 8:
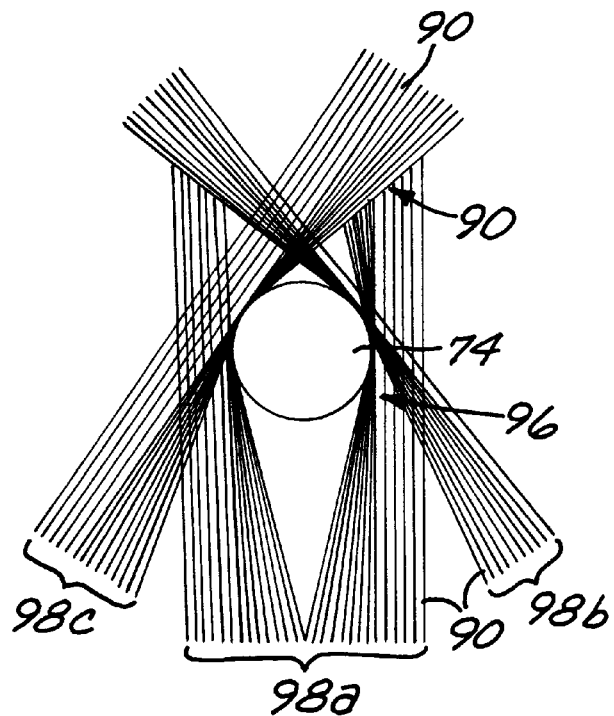
FIG. 8 is a schematic view of the winding pattern of the fibers adjacent to the aperture.
Figure 9:
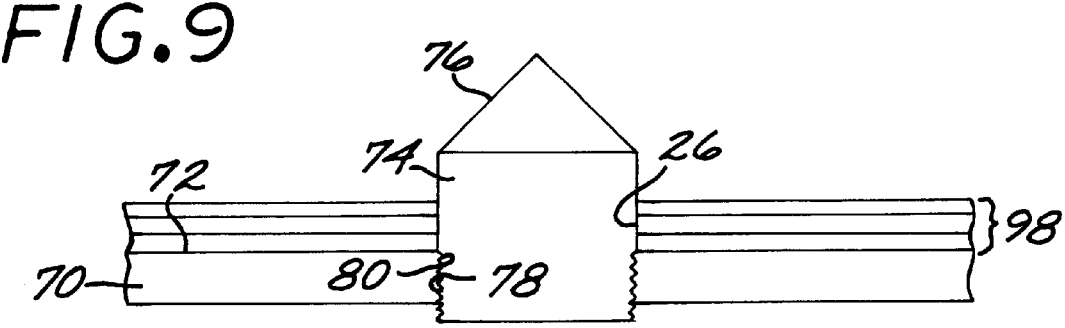
FIG. 9 is an elevational view of a shaped plug used to form the aperture.

A shaped plug 74 is placed into the winding surface 72 portion of the mandrel 70, numeral 52. The shaped plug 74 is seen from the side in FIGS. 6–7 and 9–10, and from the top (along a radius of the mandrel) in FIG. 8. The shaped plug 74 is typically cylindrical to form, as seen in FIG. 8, to produce a cylindrical aperture in the final structure, but it may be non-cylindrical as well. The shaped plug 74 typically has a conical top 76 to allow the uncured composite structure to slip over the shaped plug 74 and into place during winding, as will be discussed subsequently. Other operable raised shapes for top may be used as well, such as an ogival shape, a hemispherical shape, and the like. The lower end of the shaped plug 74 preferably has threads 78 to engage corresponding threads 80 in the side of the mandrel 70, but any other operable engagement technique may be used. The threads 78/80 allow the shaped plug 74 to be securely engaged to the mandrel 70 during the winding operation, but to be later disengaged and removed from the mandrel.

Uncured composite material is applied overlying the mandrel 70, numeral 54. The composite material is preferably applied by any operable winding technique, two of which are illustrated in FIGS. 6 and 7. The composite material is applied in a layered fashion. In FIGS. 6 and 7 a first layer 82 has already been applied and is in place, and a second layer 84 is being applied and is partially complete. During the winding operation, the mandrel 70 rotates about an axis of rotation 86 and the layer 84 is applied using a fiber guide 88 that moves parallel to the axis of rotation 86 in a controlled manner. By selecting the relative rate of rotation of the mandrel 70 and the axial movement of the fiber guide 88, the pitch of the fiber wound onto the mandrel 70 is controlled. A winding apparatus (not shown) similar to a lathe may be used for this winding operation. For the winding of large structures, the mandrel may instead be maintained stationary and the guide may be both translated and rotated.

The components of the composite material are selected so that the final composite material is formed of fibers, preferably carbon or graphite fibers, embedded in a matrix, preferably a cured polymeric matrix. To this end, a fiber 90 is supplied and fed through the guide 88 under tension. The fiber 90 is a substantially continuous strand of a single relatively large fiber or a bundle of smaller-diameter fibers. A preferred fiber material is graphite or carbon fibers, which may be purchased commercially with various mechanical and physical properties.

The matrix material is a curable polymeric precursor material. That is, the precursor material is a non-solid monomer, lower-weight polymer, or other material that, upon curing, produces a solid polymeric material. A typical polymer precursor material is an epoxy resin, furnished in a viscous liquid form. The polymer precursor may be applied in any operable way. FIG. 6 shows one approach wherein the fiber 90 is passed through a container 92 of the viscous polymer precursor liquid. Some of the polymer precursor liquid adheres to the surface of the fiber 90 as it passes through a septum 94, producing a liquid-coated fiber 90'. The liquid-coated fiber 90' is immediately wound onto the mandrel 70. In another approach illustrated in FIG. 7, the fiber 90 is wound dry onto the mandrel 70, and the polymer precursor liquid is coated onto the as-wound fiber material through an injector immediately after winding or even after the entire layer is wound. Any combination or variation of these approaches, or other operable approach, may be used.

In FIG. 6, the winding of the second layer 84 has not as yet reached the shaped plug 74. FIGS. 7 and 8 illustrate the case where the winding of the second layer 84 is past the shaped plug 74, and the resulting arrangement of the fiber material 90 around the shaped plug 74. As indicated at numeral 96, the fiber material 90 is compressed and pushed together as it approaches the shaped plug 74, forming a clustered region that produces the thickened edge 40 of FIG. 3. In this clustered region 96, the fiber material 90 remains substantially continuous and is not cut at this time or subsequently during fabrication.

As the winding proceeds, the pitch angle of the winding is typically varied between layers. (The number of layers and their orientations is determined for each particular structure by an analysis of the application, which does not form a part of the present invention.) In FIG. 8, a first layer 98a is wound at very low pitch, a second layer 98b overlying the layer 98a is wound at a high positive pitch, and a third layer 98c overlying the layer 98b is wound at a high negative pitch. (Only the portion of the layers 98b and 98c on one side of the shaped plug 74 is shown for clarity.) As is apparent from FIG. 8, as winding proceeds and more layers 98 are wound, the fibers 90 completely surround the shaped plug 74 on all lateral sides. The fibers 90 press toward the shaped plug 74 due to the winding tension, creating a close fit of the fibers 90 in the layers 98 to the sides of the shaped plug 74.

After the winding of the layers of fiber and deposition of the polymer precursor material is complete, the assembly is placed into an oven or autoclave for curing of the polymeric precursor material, numeral 56. In a typical case, a rubber pressure bag is placed over the assembly, and the bagged assembly is placed into an autoclave. The bagged assembly is heated with simultaneous application of an external pressure to the bag. The pressure aids in holding the fibers in place tightly to the surface of the mandrel and aids in removing bubbles or voids that may be present as a result of the winding operation. The combination of temperature, pressure, time, and heating rates is provided by the manufacturer of the matrix polymer precursor material, and is known in the art for each polymer precursor material. In the case of a preferred composite material having graphite fibers in an epoxy resin matrix, the curing is typically accomplished by heating for 1–5 hours at 200 ±10° F.

Upon completion of curing, the shaped plug 74 is removed from the mandrel 70, by unscrewing in the illustrated case, and the mandrel 70 is removed from the interior of the hollow composite shell, numeral 58. The result is a composite shell with a smooth aperture 26 therethrough having a locally thickened edge 38, of the type shown in FIG. 3. The clustered fibers result in increased strength of the thickened region 38 of composite material around the periphery of the aperture. The combination of a smooth edge and the local thickening of the composite material produces a highly desirable structure that resists initiation of fracture at the aperture. This result is contrasted with that shown in FIG. 4, where the aperture 26' must be later cut into the wall of the shell, leaving cut fibers, microcracks, and a weakened area susceptible to failure initiation at the periphery of the aperture.

Optionally for some polymeric materials used in the matrix of the composite material that forms the shell, there is a post-curing procedure, numeral 60. In post curing, the shell is heated to elevated temperature for a period of time, in a free-standing manner without the mandrel or shaped plug present, to achieve even further curing of the polymeric material. As with the curing procedure, the post-curing procedure, if any, is performed according to directions specified by the supplier of the polymeric precursor material.

Figure 10:
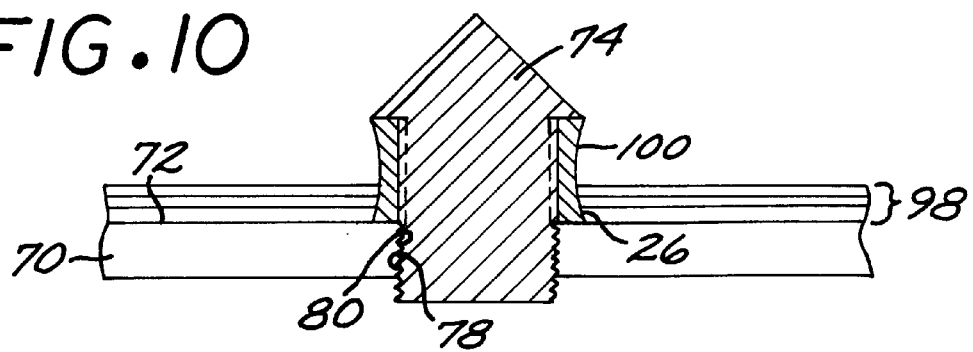
FIG. 10 is a side sectional view of a shaped plug core and bushing combination at an intermediate stage of fabrication.

FIGS. 2 and 10 illustrate another embodiment of the invention. In this embodiment, an annular bushing 100 is slipped over the shaped plug 74 before it is attached to the mandrel 70. The shaped plug 74 thereby acts as a plug core to define the plug position and support the bushing in position. The composite material is wound over the shaped plug 74 as described previously, but contacts the edge of the bushing 100 instead of the surface of the shaped plug 74. When the composite material is cured in step 56, the polymeric material adheres to the surface of the bushing 100, binding it in the aperture 26. When the shaped plug 74 is removed in step 58, the bushing 100 remains in the aperture 26 and in the final structure, bound to the aperture. The bushing 100 of FIG. 10 has a slightly concavely curved outer surface, so that the layers 98 of cured composite material tend to bind it tightly into the aperture. The bushing 100 may be present to serve as an attachment point for lateral support members in a structure or as an attachment place for an access door, for example. (In FIG. 10, only three layers 98 of the composite material are illustrated. The illustrated bushing 100 has a length sufficient for additional layers to be added, and in general is selected in cooperation with the number of layers 98 to be used.)

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a composite structure, comprising the steps of providing a mandrel having a winding surface;

placing a shaped plug into the winding surface and extending therefrom;

applying a layer of an uncured composite material over the winding surface of the mandrel and laterally adjacent to the shaped plug; and curing the composite material.

2. The method of claim 1, including an additional step, after the step of curing, of removing the shaped plug and the mandrel.

3. The method of claim 1, wherein the step of providing a mandrel includes the step of providing a cylindrical mandrel, and wherein the winding surface is the cylindrical surface of the mandrel.

4. The method of claim 1, wherein the step of placing a shaped plug includes the step of providing a shaped plug having a conical upper surface.

5. The method of claim 1, wherein the step of placing a shaped plug includes the step of providing a plug comprising a shaped plug core and an overlying bushing.

6. The method of claim 5, including an additional step, after the step of curing, of removing the plug core and the mandrel, but leaving the overlying bushing bonded in contact with the cured composite material.

7. The method of claim 1, wherein the step of applying an uncured composite material is performed by the steps of providing a fiber material selected from the group consisting of graphite and carbon, winding the fiber material overlying the winding surface of the mandrel, and co-applying an uncured polymeric precursor matrix material with the fiber material, and wherein the step of curing the composite material is performed by the step of curing the polymeric precursor material.

8. The method of claim 7, wherein the steps of winding and co-applying are performed simultaneously.

9. The method of claim 7, wherein the step of winding includes the step of winding a layer of the fiber material, and wherein the step of co-applying includes the step of depositing matrix material on the wound layer.

10. The method of claim 1, including an additional step, after the step of applying and before the step of curing, of applying at least one additional layer of an uncured composite material overlying the layer of the uncured composite material, the at least one additional layer having a winding angle relative to the mandrel different from that of the layer of the uncured composite material.

11. A composite structure prepared by the method of claim 1.

12. A composite structure prepared by the method of claim 6.

13. A composite structure prepared by the method of claim 10.

14. A method for preparing a composite structure, comprising the steps of providing a cylindrical mandrel having a winding surface;

placing a shaped plug into the winding surface and extending therefrom;

applying a plurality of layers of an uncured composite material over the winding surface of the mandrel and laterally adjacent to the shaped plug, for each layer the step of applying including the steps of providing a fiber material selected from the group consisting of graphite and carbon, winding the fiber material overlying the winding surface of the mandrel at a winding angle different from a winding angle of a previously wound layer of the fiber material, and applying an uncured polymeric precursor matrix material to the fiber material; and curing the polymeric precursor material.

15. The method of claim 14, including an additional step, after the step of curing, of removing the shaped plug and the mandrel.

16. The method of claim 14, wherein the step of placing a shaped plug includes the step of providing a plug comprising a shaped plug core and an overlying bushing.

17. The method of claim 16, including an additional step, after the step of curing, of removing the shaped plug core and the mandrel, but leaving the overlying bushing bonded in contact with the cured composite material.

* * * * *